United States Patent [19]
Moewe

[11] 3,861,020
[45] Jan. 21, 1975

[54] SEAL INSTALLING TOOL
[75] Inventor: Clinton F. Moewe, Pekin, Ill.
[73] Assignee: Caterpillar Tractor Co., Peoria, Ill.
[22] Filed: Apr. 26, 1973
[21] Appl. No.: 354,898

[52] U.S. Cl. .................................................. 29/235
[51] Int. Cl. ........................................... B23p 19/02
[58] Field of Search ........................ 29/235; 81/3 E

[56] References Cited
UNITED STATES PATENTS

| | | | |
|---|---|---|---|
| 2,307,884 | 1/1943 | Greenwood | 29/235 |
| 2,939,208 | 7/1960 | Voorhorst | 29/235 |
| 3,180,015 | 4/1965 | Thompson et al. | 29/235 |
| 3,553,817 | 1/1971 | Lallak | 29/235 |

FOREIGN PATENTS OR APPLICATIONS

| | | | |
|---|---|---|---|
| 921,015 | 3/1963 | Great Britain | 29/235 |

Primary Examiner—James L. Jones, Jr.
Attorney, Agent, or Firm—Phillips, Moore, Weissenberger Lempio & Strabala

[57] ABSTRACT

A tool has an elongated tool body which defines a plurality of channels thereabout. A portion of an annular resilient member, such as a seal or protective ring, is positioned in one of these channels and is held therein by the side walls thereof. The tool is then inserted into a bore to position the resilient member next to a receiving groove in the bore. The base of the channel defines a camming surface so that upon rotation of the body, a portion of the resilient member is forced from the channel and into the groove, to seat therein. The remaining part of the resilient member is then installed, using the extended end of the tool.

7 Claims, 4 Drawing Figures

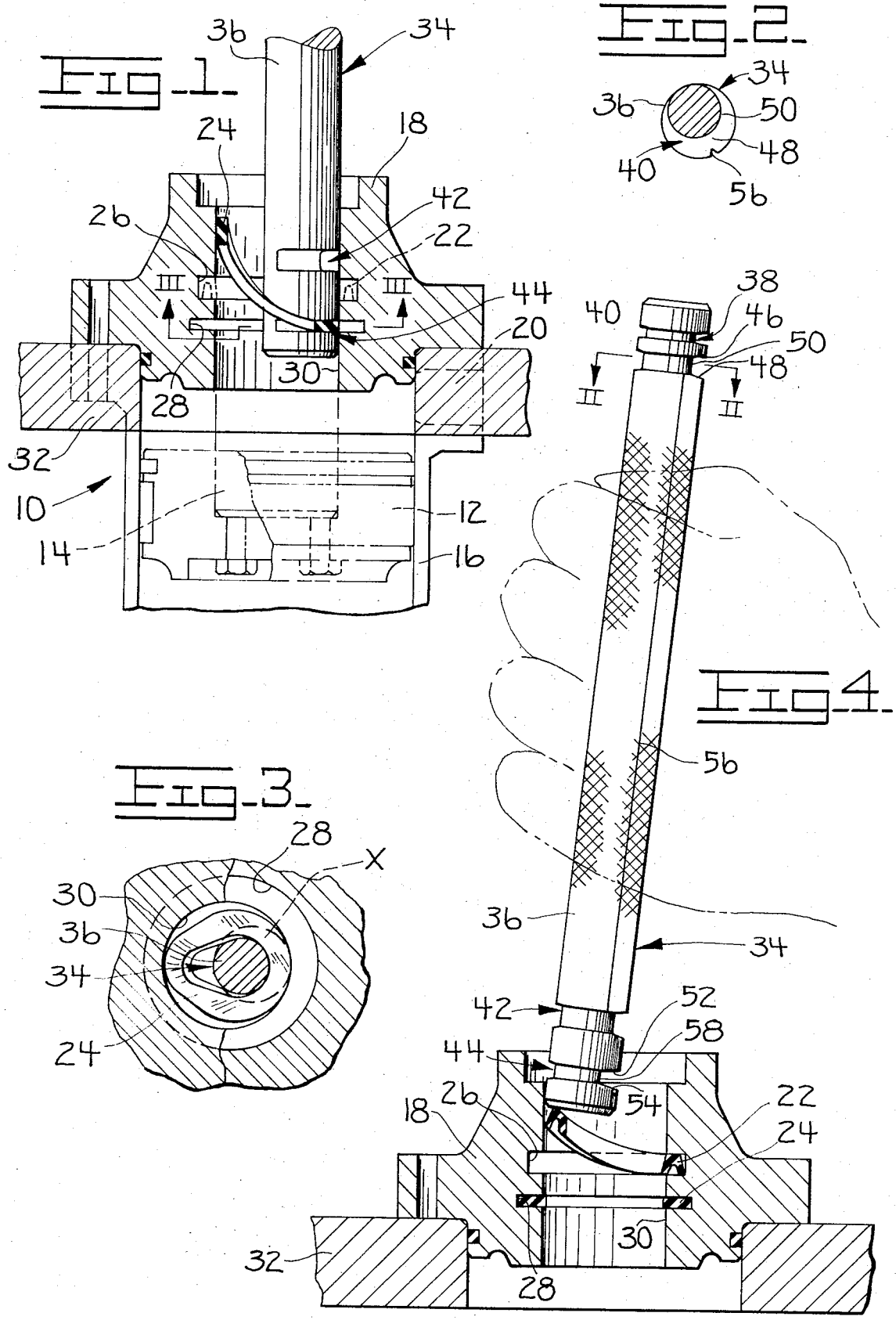

3,861,020

SEAL INSTALLING TOOL

BACKGROUND OF THE INVENTION

This invention relates to a tool for installing seals or the like, and more particularly, to such a tool which is used for installing a seal or the like in a groove defined within a bore.

Typically, hydraulic cylinders require the installation of annular resilient seals and protective rings for the cylinder rod in internal annular grooves of the cylinder end cap to prevent the leaking of oil or the entrance of dirt and other contaminants into the cylinder. The installation of such seals and rings must, of course, be done in a manner so as not to damage them and prevent their proper operation. Installing these resilient members by hand is physically difficult and time-consuming due to the relative stiffness of the members and their installation in remote internal annular grooves of the cylinder end caps.

Mechanical means are sometimes used for installing such resilient members, but are considered generally unsatisfactory due to their cost and time-consuming nature. In addition, with certain types of mechanical seals and rings, a different size installing tool would be required for each size of seal or ring to be installed.

SUMMARY OF THE INVENTION

It is an object of this invention to provide a tool which is capable of being conveniently used to install an annular resilient member in a groove defined within a bore.

It is a further object of this invention to provide a tool which, while fulfilling the above object, is capable of operating to install a variety of resilient member sizes.

It is a still further object of this invention to provide a tool which, while fulfilling the above objects, is capable of installing such resilient members relatively easily and conveniently, and without damage thereto.

Broadly stated, the invention is a device for installing a portion of a resilient member in a receiving member groove. The device comprises a body, and holding means associated with the body for releasably holding a portion of the resilient member, so that the portion of the resilient member may be positioned relative to and adjacent the groove by positioning of the body relative to the receiving member. Means are associated with the body for urging and moving the portion of the resilient member positioned relative to and adjacent the groove inwardly of the groove to install said portion of the resilient member in the groove.

BRIEF DESCRIPTION OF THE DRAWINGS

These and other objects of the invention will become apparent from a study of the following specification and drawings, in which;

FIG. 1 is a side sectional elevation of a cylinder end cap, showing the installation of a resilient member therein by the installing tool;

FIG. 2 is a sectional view taken along the line II—II of FIG. 4;

FIG. 3 is a sectional view taken along the line III—III of FIG. 3; and

FIG. 4 is a side sectional elevation of a cylinder end cap, showing the further use of the installing tool.

DESCRIPTION OF THE PREFERRED EMBODIMENT

Referring to the included drawings, FIG. 1 discloses, in section, the rod end of a typical hydraulic cylinder 10 wherein a portion of a piston 12, piston rod 14, cylinder 16 and detachably secured cylinder end cap member 18 are shown in broken lines to illustrate the functional relationship of the complementing components. Inlet ports 20 (one shown) are generally provided at opposite ends of the cylinder to allow selective extension or retraction of piston 12 in a desired work function to be accomplished when a suitable control valve (not shown) is manipulated.

Prior to final assembly of the member 18 to the cylinder 16, resilient members (i.e., seal 22 and protective ring 24) are installed in internal grooves 26 and 28, which are defined within the rod bore 30 of end cap member 18. The member 18 is conveniently held in a suitable fixture 32, as shown in FIGS. 1 and 4.

To facilitate installation of the resilient members 22, 24 in internal grooves 26 and 28, a small hand tool 34 is used. The tool 34 has an elongated body 36 which defines channels 38, 40, 42 and 44 thereabout. As shown in FIGS. 2 and 4, channel 40 has sidewalls 46, 48 and a base 50. The channel 40 is eccentric in cross-section, as shown in FIG. 2. The other channels 38, 42, 44 are similar in configuration, but the distance between the walls (the width of the channels) and the depth of the channels are different, to accommodate different size seals and rings for increased versatility. The central portion of the body 36 is knurled for grip by the installer.

In the use of the device 34, a resilient member 24 is installed in place in channel 44 of the body 36. The width of the channel 44 is sized substantially the same as the width of the resilient member 24 to be installed, so that the walls 52, 54 act as holding means for holding a portion of the resilient member 24. The installer may then position that portion of the resilient member relative to and adjacent the groove 28 in which said resilient member 24 is to be installed, by insertion of the body 36 into the bore 30. The channel 44 at its deepest point is sized in relation to the resilient member 24 so that only a small portion of the resilient member 24 protrudes beyond the channel 44. A scribed line marking 56 extends along the body 36 and is positioned to indicate the point of greatest channel depth to alert the installer of the initial installation position.

Upon proper positioning of the resilient member 24, the installer rotates the body 36 approximately 180° generally about its longitudinal axis. The base 58 of the channel 44 defines a camming surface which, upon such rotation, urges and moves the portion of the resilient member 24 disposed between the walls 52, 54 outwardly of the channel 44 and inwardly of the groove 28. Such camming action aligns and forcibly seats the resilient member 24 in the groove 28. Member 18 thus acts as a receiving member.

The tool 34 is revolved sufficiently within the bore 30 to quickly and conveniently effect positive placement of a sizable portion of the resilient member 24. Completion of the installation is done by pushing the remainder of the resilient member 24 in alignment with its groove 28 using the end of the body 36 as generally shown in FIG. 4. Once installation of all resilient members 22, 24 is complete, member 18 is ready for attachment to the cylinder 16.

The varied width, eccentrically machined channels at the ends of a portable tool 34 make possible positive holding, piloting and seating of resilient members in remote, confined areas conveniently and with a minimum manual effort. The channels afford simultaneous axial holding and radial application of force to assure positive initial sealing of the resilient members. The resilient members may be easily located relative to the corresponding grooves through the dimensional specifications described above. This is done by allowing a small peripheral portion of the resilient member to protrude from the deepest portion of the channel associated therewith.

The tool 34 may with advantage be of plastic material, so as to be light and economical. Additional channels of any desired width and depth can be readily added to a tool 34 to accommodate bigger or more complex resilient member arrangements.

To best tolerate variations in the width of such mass produced resilient seals and rings, it has also been advantageous to provide slight outward tapers on the sidewalls of grooves 38, 40, 42, and 44. In the event flash material or small protrusions are inadvertently left on the die formed seals or rings, the tapered walls of the tool channels will still assure a satisfactory transfer of such members to their receiving grooves.

What is claimed is:

1. A device for installing a portion of a resilient member in a receiving member groove comprising: a body; holding means associated with the body for releasably holding a portion of the resilient member, so that the portion of the resilient member may be positioned relative to and adjacent the groove by positioning of the body relative to the receiving member; and means associated with the body for urging and moving the portion of the resilient member positioned relative to and adjacent the groove inwardly of the groove to install said portion of the resilient member in the groove, wherein the means for urging and moving the portion of the resilient member comprise cam means for urging and moving the portion of the resilient member inwardly of the groove upon rotation of the body about its longitudinal axis relative to the receiving member.

2. A device for installing a portion of a resilient member in a receiving member groove comprising: a body; holding means associated with the body for releasably holding a portion of the resilient member, so that the portion of the resilient member may be positioned relative to and adjacent the groove by positioning of the body relative to the receiving member; and means associated with the body for urging and moving the portion of the resilient member positioned relative to and adjacent the groove inwardly of the groove to install said portion of the resilient member in the groove, wherein the body defines a channel, said holding means comprising a portion of said channel, in which the portion of the resilient member is disposable, wherein the means for urging and moving the portion of the resilient member comprise cam means for urging and moving the portion of the resilient member outwardly of the channel and inwardly of the groove upon rotation of the body relative to the receiving member.

3. A device for installing a portion of a resilient member in a receiving member groove comprising: a body; holding means associated with the body for releasably holding a portion of the resilient member, so that the portion of the resilient member may be positioned relative to and adjacent the groove by positioning of the body relative to the reeceiving member; and means associated with the body for urging and moving the portion of the resilient member positioned relative to and adjacent the groove inwardly of the groove to install said portion of the resilient member in the groove, wherein the body defines a channel having sidewalls and a base, and wherein the means for releasably holding a portion of the resilient member comprise said sidewalls between which the portion of the resilient member is disposable wherein the base of the channel defines a camming surface for urging and moving the portion of the resilient member outwardly of the channel and inwardly of the groove upon rotation of the body relative to the receiving member.

4. A device for installing a portion of a resilient member in a groove defined within a bore of a receiving member comprising;
   an elongated body defining a channel thereabout, said channel having sidewalls and a base, said sidewalls acting as holding means for holding a portion of said resilient member therebetween, so that said portion of the resilient member may be positioned relative to and adjacent the groove by insertion of the body into the bore;
   the base of the channel defining a camming surface for urging and moving the portion of the resilient member disposed between said walls upon rotation of said body generally about its longitudinal axis relative to the receiving member, outwardly of the channel and inwardly of the groove, to install said portion of the resilient member in the groove.

5. The device of claim 4 wherein the resilient member portion and the deepest portion of the channel are sized in relation to each other so that, with said resilient member portion fully disposed in the deepest part of the channel, a portion of the resilient member portion protrudes beyond saaid channel.

6. The device of claim 5 and marking means extending along the body for indicating the deepest part of the channel.

7. The device of claim 6 wherein the sidewalls of said channel are slightly outwardly tapering surfaces.

* * * * *